United States Patent [19]
Adams

[11] 4,263,166
[45] Apr. 21, 1981

[54] SPRAY FOAM INSULATION GUN

[75] Inventor: Ladd M. Adams, Norman, Okla.

[73] Assignee: Entek Corporation, Norman, Okla.

[21] Appl. No.: 89,991

[22] Filed: Oct. 31, 1979

Related U.S. Application Data

[63] Continuation of Ser. No. 901,245, Apr. 28, 1978, abandoned.

[51] Int. Cl.³ .................. B01F 17/00; B01F 3/08; B01J 13/00; B05B 15/02
[52] U.S. Cl. .................. 252/359 E; 239/113; 239/414; 422/133
[58] Field of Search .................. 252/359 E; 422/133; 261/DIG. 26; 137/607; 239/112, 113, 414; 366/11

[56] References Cited

U.S. PATENT DOCUMENTS

| | | | |
|---|---|---|---|
| 2,388,508 | 11/1945 | Timpson | 261/DIG. 26 |
| 3,256,067 | 6/1966 | Shriver et al. | 422/133 |
| 3,318,530 | 5/1967 | Rhodes | 239/414 X |
| 3,417,923 | 12/1968 | Carlson | 239/112 |
| 3,434,805 | 3/1969 | Bar | 422/133 |
| 3,690,556 | 9/1972 | McCain | 239/112 |
| 4,021,386 | 5/1977 | Lindstrom | 422/133 X |
| 4,060,572 | 11/1977 | Widmann | 239/113 X |
| 4,117,551 | 9/1978 | Brooks et al. | 239/414 X |
| 4,121,906 | 10/1978 | Oldham | 422/133 |
| 4,137,048 | 1/1979 | Steinman | 422/133 |

FOREIGN PATENT DOCUMENTS
981898 1/1976 Canada .................. 239/112

Primary Examiner—Frank W. Lutter
Assistant Examiner—Roger F. Phillips
Attorney, Agent, or Firm—Laney, Dougherty, Hessin & Beavers

[57] ABSTRACT

An apparatus is provided for the mixing of a first liquid foaming agent component with compressed air in a mixing chamber to produce a foam. A nozzle for ejecting a second liquid component into the foam is provided downstream of the mixing chamber. The mixing chamber is attached to the downstream side of a valve housing. The valve housing includes a triple plug valve for simultaneously selectively connecting and disconnecting a first liquid component inlet and an air inlet with the mixing chamber and a second liquid component inlet with the nozzle. First port means, connecting the air inlet downstream of the triple plug valve, to a plurality of air ejection orifices communicating with the mixing chamber is provided within the valve housing. Air control valve means is provided within said first port means for controlling the amount of air flowing to said mixing chamber. Second port means is provided, within said valve housing, for communicating the air inlet port upstream of said triple plug valve with a fluid passage for the second liquid component at a point downstream of said triple plug valve, to provide purge air to the nozzle. A second valve means is provided in said second port means for controlling the flow of purge air to the nozzle.

25 Claims, 12 Drawing Figures

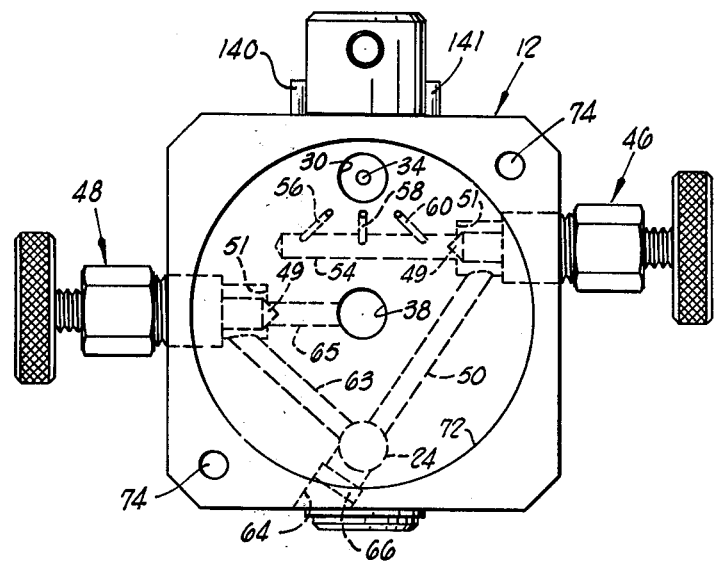
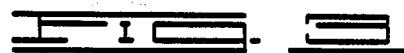
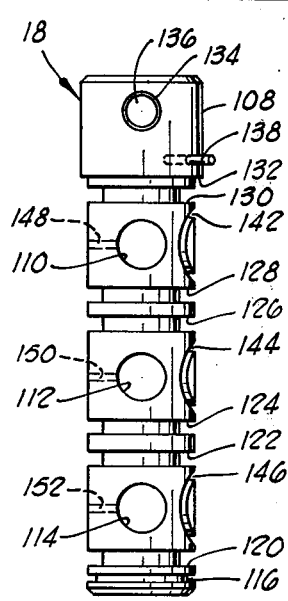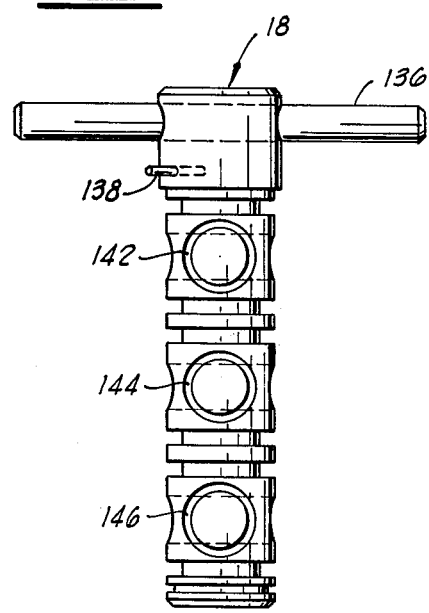
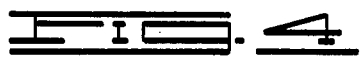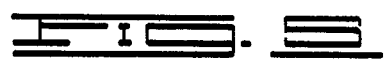
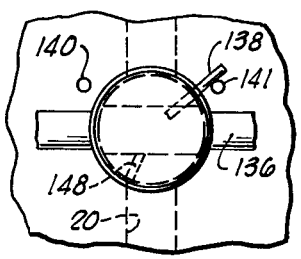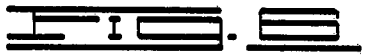

SPRAY FOAM INSULATION GUN

RELATED APPLICATION

This application is a continuation-in-part of my prior U.S. application Ser. No. 901,245 filed Apr. 28, 1978, now abandoned.

BACKGROUND OF THE INVENTION

1. Field of the Invention

This invention relates generally to apparatus for mixing and spraying foam insulation and more particularly, but not by way of limitation, to such apparatus having purge air systems for cleaning of the passageways subsequent to the mixing of the foam components.

2. Description of the Prior Art

The prior art includes numerous devices for the mixing and application of foam insulation. Such apparatus generally include a mixing chamber wherein a first liquid component is mixed with compressed air, and a nozzle downstream of the mixing chamber whereby a second liquid component is ejected into the mixture of the first component and air. Most of those devices are, however, of a very bulky complex design including much external tubing.

The present invention provides a compact efficient apparatus for the mixing of components for foam insulation and also provides simple and efficient means for the cleaning of the apparatus by purging the orifices of the nozzle with air after the mixing operation.

SUMMARY OF THE INVENTION

An apparatus is provided for the mixing of a first liquid foaming agent component with compressed air in a mixing chamber to produce a foam. A nozzle for ejecting a second liquid component into the foam is provided downstream of the mixing chamber. The mixing chamber is attached to the downstream side of a valve housing. The valve housing includes a triple plug valve for simultaneously selectively connecting and disconnecting a first liquid component inlet and an air inlet with the mixing chamber and a second liquid component inlet with the nozzle. First port means, connecting the air downstream of the triple plug valve, to a plurality of air mix orifices communicating with the mixing chamber is provided within the valve housing. Air control valve means is provided within said first port means for controlling the amount of air flowing to said mixing chamber. Second port means is provided, within said valve housing, for communicating the air inlet port upstream of said triple plug valve with a fluid passage for the second liquid component at a point downstream of said triple plug valve, to provide purge air to the nozzle. A second valve means is provided in said second port means for controlling the flow of purge air to the nozzle.

It is therefore a general object of the present invention to provide an apparatus for the mixing of foam insulation for spraying upon a surface.

A further object of the present invention is to provide a spray foam mixing apparatus having means for purging the apparatus with air to prevent the fluid components from setting up inside the apparatus.

Another object of the present invention is the provision of a spray foam insulation apparatus providing a superior mixture of the liquid components so as to provide the desired homogenous distribution of the components within the foam to create a structurally sound foam body.

Yet another object of the present invention is the provision of a light weight compact easily manufactured, operated and serviced spray foam insulation gun.

Other and further objects, features and advantages of the present invention will be apparent to those skilled in the art upon a reading of the description of preferred embodiments which follows when taken in conjunction with the accompanying drawings.

BRIEF DESCRIPTION OF THE DRAWINGS

FIG. 3 is a frontal view of the valve housing of FIG. 1 showing portions of the internal porting of the valve housing in dashed lines.

FIG. 4 is a lengthwise view of the triple plug valve.

FIG. 5 is a second view of the triple plug valve of FIG. 4 rotated through an angle of 90° about its central axis.

FIG. 6 is a top view of that portion of the valve housing which receives the triple plug valve, and shows the stop bars which limit the rotational position of the triple plug valve within the valve housing.

DETAILED DESCRIPTION OF THE PREFERRED EMBODIMENTS OF THE INVENTION

Figure 1:
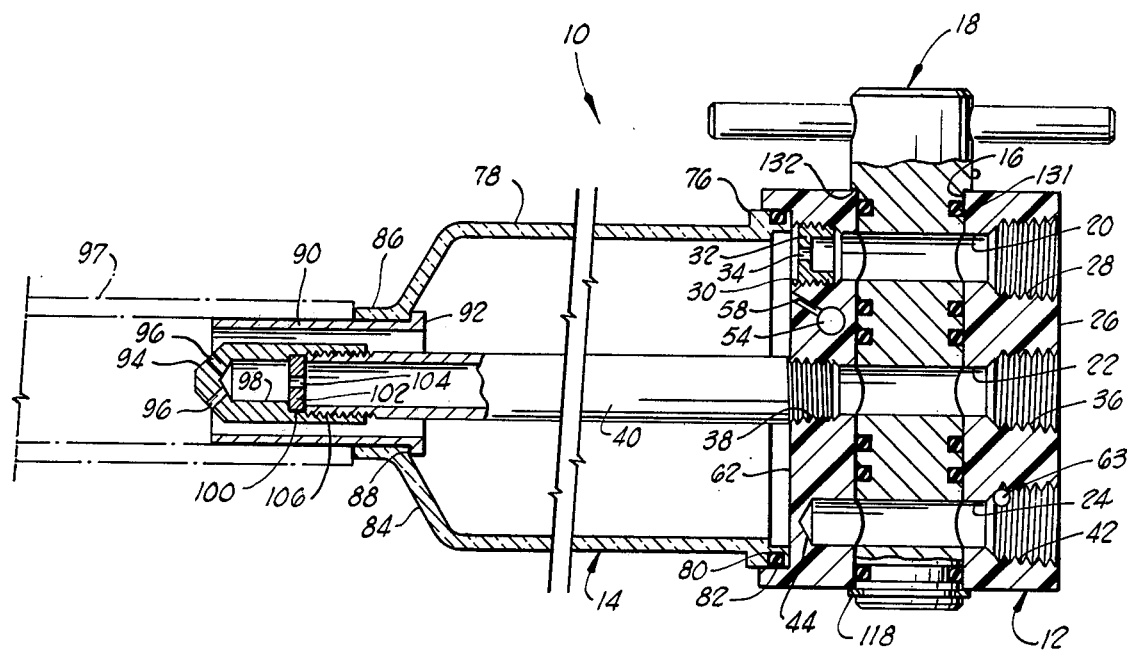
FIG. 1 is a sectional partially cut-away view of the foam insulation spray gun of the present invention.

Referring now to the drawings, and particularly to FIG. 1, the foam insulation spray gun of the present invention is shown and generally designated by the numeral 10. The spray gun 10 includes a valve housing 12 with a mixing chamber 14 attached to the front side of the valve housing.

In the following description the terms "upstream" and "downstream" are often used to define the orientation of one component of the spray gun 10 to another component. This, of course, refers to the direction of flow of the various fluids through the spray gun 10. The fluids first enter the valve housing 12, flow through various porting and valves within the valve housing and then into the mixing chamber 14 or to the nozzle 94. Thus, the mixing chamber 14 is said to be downstream of the valve housing 12, and the nozzle 94 is said to be downstream of the mixing chamber 14.

The valve housing 12 is comprised of a substantially rectangular parallelepiped nylon block. Disposed therethrough is a transverse plug valve bore 16, within which is rotatingly received a triple plug valve generally designated by the numeral 18.

The valve housing 12 has longitudinally disposed therein three substantially parallel inlet bores 20, 22 and 24. These are the foaming agent inlet bore, the resin inlet bore and the compressed air inlet bore, respectively. The longitudinal inlet bores 20, 22 and 24 each communicate with rear end surface 26 of the valve housing 12 and intersect the transverse plug valve bore 16.

With respect to the components comprising the final foam mixture, the foaming agent and resin solution may be referred to as first and second fluid or liquid components, and the compressed air may be referred to as a gaseous component.

The triple plug valve 18 comprises a means for simultaneously selectively connecting and disconnecting the foaming agent inlet bore 20 and the compressed air inlet bore 24 to the mixing chamber 14, and the resin solution inlet bore 22 to the nozzle 94.

The longitudinal bore 20 includes a threaded foaming agent inlet 28. The bore 20 also includes a threaded foaming agent outlet 30 communicating with the interior of the mixing chamber 14. Threadedly received within the foaming agent outlet 30 is a metering insert 32 having a foaming agent orifice 34 disposed therein.

The longitudinal bore 22 includes a threaded resin inlet 36 at one end thereof communicating with the rear surface 26 of the valve housing 12. At the other end of the bore 22 is a threaded resin outlet 38. Threadedly received within the outlet 38 is a longitudinally extending resin tube 40 which is concentric with and located along the longitudinal axis of the mixing chamber 14.

The longitudinal bore 24 includes a threaded compressed air inlet 42 at on end thereof. The second end 44 of the compressed air bore 24 is a blind end.

Figure 7:
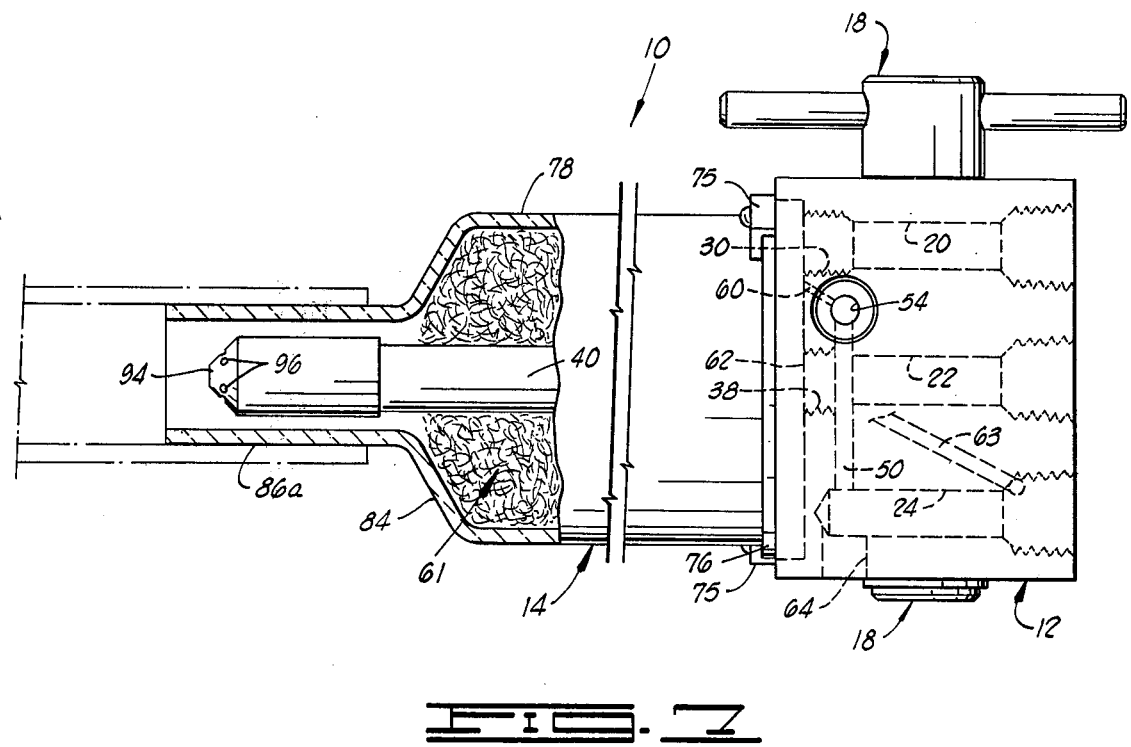
FIG. 7 is a partially cut-away view of an alternative embodiment having an integral mixing chamber and forward nipple portion. Also various internal porting of the valve housing is shown in dashed lines.

Referring now to FIGS. 3 and 7, various internal porting of the valve housing 12 is shown in dashed lines. Mounted within the valve housing 12 is an air control valve 46 and a resin-air purge valve 48. Each of the valves 46 and 48 includes a conical valve member 49 which seats upon a shoulder 51 machined into the valve housing 12.

A first internal port 50 communicates between a portion of the compressed air bore 24 downstream of the triple plug valve 18, as is best seen in FIG. 7, and the upstream side of the air control valve 46, as is best seen in FIG. 3. The downstream side of the air control valve 46 communicates with a transverse blind port 54 which has three air ejection orifices 56, 58 and 60 communicating with the transverse blind port 54 and the front surface 62 of the valve housing 12 closely adjacent the foaming agent outlet 30.

Each of the three air ejection orifices 56, 58 and 60 is oriented so that an imaginary extension of its central axis intersects an imaginary forward extension of the longitudinal or central axis of the foaming agent orifice 34. Also, the air ejection orifices 56, 58 and 60 are not parallel to each other and they therefore intersect with the axis of the foaming agent orifice 34 at three different angles. This causes the jets of compressed air emitted from the air ejection orifices to impinge upon the jet of foaming agent emitted from the foaming agent orifice 34 at a variety of angles thereby contributing to the turbulence in the mixing chamber 14 to assure adequate foaming of the foaming agent.

To aid the agitation and turbulent mixture of the foaming agent and compressed air within the mixing chamber 14 it is desirable that the interior of the mixing chamber 14 be packed with a porous filler material 61. The filler material 61 is preferably comprised of brass wire scouring pads such as are used for domestic cleaning or a plurality of glass beads.

A second internal port 63 communicates between a portion of the compressed air bore 24 upstream of the triple plug valve 18, as best seen in FIG. 7, and the upstream side of the resin air purge valve 48, as best seen in FIG. 3. The downstream side of the resin air purge valve 48 communicates with the resin bore 22 and resin outlet 38, by means of the third internal port 65. In this manner, compressed air may be directed to the resin line to purge it after the triple plug valve 18 is closed. This is due to the fact that the purge air is taken by internal port 63 from upstream of the triple plug valve 18, as seen in FIG. 7.

Also communicating with the compressed air bore 24, and in substantially the same plane as the first port 50, is a drilling cavity 64 which communicates with an external surface of the valve housing 12. The drilling cavity 64 provides means for a drill to be inserted to drill out the first internal port 50. After drilling of the port 50, the drilling cavity 64 is plugged with a brass plug 66.

The front surface 62 of the valve housing 12 further includes a disc shaped recess 72 which is concentric with and receives the mixing chamber 14. On opposite sides of the recess 72, as viewed in FIG. 3, are two threaded holes 74 by means of which retaining clips 75, which fit over the shoulder 76 of the mixing chamber 14, may be fastened to the valve body 12 to retain the mixing chamber 14 in place upon the valve body 12.

The mixing chamber 14 includes a cylindrical outer body 78 having at its rear end the shoulder 76 for engagement with the valve housing 12 as previously described. The shoulder 76 includes therein an annular groove 80 within which is received a resilient O-ring seal 82. The cylindrical outer body 78 is preferably constructed of a transparent material so that the mixing action within the mixing chamber 14 may be observed. This allows any malfunction to be quickly detected.

The forward portion of the cylindrical body 78 of the mixing chamber 14, as viewed in FIG. 1, includes a truncated conical shoulder portion 84 and a smaller cylindrical forward extending portion 86. Along the internal surface of the mixing chamber 14 where the conical shoulder portion 84 meets the cylindrical forward extension 86 there is a flat annular surface 88. Concentrically and closely received within the internal portion of the forward extending portion 86 is a brass nipple 90. The brass nipple 90 includes a radially outward extending flange 92 which seats upon the shoulder 88. The brass nipple 90 is press fit within the cylindrical extension 86 and may also be retained therein by an adhesive placed between the nipple 90 and the cylindrical extension 86 if necessary.

An alternative embodiment of the forward portion of the mixing chamber 14 is illustrated in FIG. 7. There the brass nipple has been deleted and replaced by an elongated forward cylindrical extension 86a, which is constructed integrally with the mixing chamber 14.

Concentrically inner of and radially spaced from the brass nipple 90 is the resin tube 40. Threadedly engaging the forward end of the resin tube 40 is the resin nozzle 94. The nozzle 94 includes a plurality of radial angularly extending resin orifices 96. Preferably six orifices 96, radially spaced at angles of 60° are provided.

In the embodiment of FIG. 1, the nipple 90 terminates adjacent the resin ejection orifices 96. In the embodiment of FIG. 7, the cylindrical extension 86a extends downstream past the resin ejection orifices 96.

The foam formed by the agitated mixing of the foaming agent and compressed air within the mixing chamber 14 exits the spray foam insulation gun 10 in an annular stream through the annular space between the nipple 90 and the nozzle 94, thereby surrounding the nozzle 94. The foam is then flowing approximately parallel to the longitudinal axis of the apparatus.

The foam mixture is said to be axial flowing in that each of the foam particles are flowing in a direction substantially parallel to a central longitudinal axis of the annular stream of foam, as opposed to exiting the annular space in a swirling fashion. As the foam exits the insulation gun 10 the resin solution is ejected into the foam through the resin orifices 96, so as to angularly impinge upon an internal portion of said annular stream, so that a turbulent mixture of foam and resin solution is produced downstream of the orifices 96.

It is necessary that the resin solution be thoroughly mixed with the foam so as to provide a homogeneous distribution of resin throughout the cellular structure of the foam. It is this mixture of the resin solution with the foam which causes the foam to harden and retain its cellular structure. If the resin solution is not thoroughly mixed with the foam, that portion of the foam unaffected by the resin will not properly harden and the cellular structure will deteriorate as the foam dries out thereby destroying the desired insulating property of the foam.

To assure a thorough mixing of the resin solution with the foam, the resin orifices 96 are oriented at an angle of 45° with the longitudinal axis of the spray foam insulation gun 10. The jets of resin solution emitted from the orifices 96 then impinge upon the annular stream of foam exiting the insulation gun at a 45° angle thereby creating a turbulent mixture of foam and resin solution. In its preferred mode of operation, a hose 97 is closely fitted about the external surface of the nipple 90 so that the foam insulation may be more easily directed to the surface to which it is to be applied by means of the hose 97. The actual mixing of the resin solution with the foam then takes place outside the insulation gun 10, and preferably within the hose 97.

It is important that this mixing take place outside the insulation gun 10, because of the catalyst effect of the resin solution upon the foam which causes it to harden almost immediately after being mixed with the resin solution. This feature, along with the purge air system, the operation of which is described in more detail below, allows the insulation gun 10 to be operated repeatedly over long intervals without the need for disassembly and cleaning of the insulation gun 10.

The nozzle 94 has disposed therein an internal longitudinal blind bore 98 which has a first counterbore 100. A resin metering insert 102 with a resin metering orifice 104 is concentrically and closely received within the counterbore 100. A threaded portion 106 of the counterbore 100 threadedly engages the forward end of the resin tube 40 in such a manner that the end of the resin tube 40 engages the resin metering insert 102 and clamps it against the shoulder formed between the bore 98 and the counterbore 100 thereby holding the insert 102 in place.

The bore 98 also communicates with the resin orifices 96 whereby resin may travel from the inlet 36, through the bore 22, the outlet 38, the resin tube 40, the resin metering orifice 104, the bore 98 and out the resin orifices 96.

Referring now to FIGS. 4 and 5, the triple plug valve 18 comprises a cylindrical shaft 108 having disposed therethrough three parallel bores 110, 112 and 114 which are coincident with the bores 20, 22 and 24 when the triple plug valve 18 is in place within the valve housing 12 and is in the open position illustrated in FIG. 1. The bores 110, 112 and 114 are substantially perpendicular to the central axis of the shaft 108.

Beginning at the lower portion of the valve 18 as viewed in FIG. 4, the cylindrical portion 108 includes a first annular key retaining groove 116 which receives the keeper key 118 as is seen in FIG. 1. Successively spaced from the annular key retaining groove 116 are annular resilient seal grooves 120, 122, 124, 126, 128 and 130.

The resilient seal grooves 120 and 122 are disposed one on either side of the bore 114. Similarly, grooves 124 and 126 are disposed on either side of the bore 112 and grooves 128 and 130 are disposed on either side of the bore 110. Each of the grooves 120 through 130 receives a resilient O-ring 131. Note that in this manner, a double seal, e.g., the seals 131 retained within grooves 122 and 124, is provided between adjacent bores, e.g., the bores 112 and 114. This provides a double seal against that possibility of premature mixing of the fluids contained in the bores 112 and 114. Similarly a double seal is provided between bores 110 and 112.

The upper end of the cylindrical shaft 108 of the triple plug valve 18, as viewed in FIGS. 4 and 5, is of greater diameter than that portion located below the groove 130 thereby forming a shoulder 132 adjacent the groove 130. The shoulder 132 engages an outer surface of the valve housing 12 to limit inward positioning of the triple plug valve 18 within the valve housing 12 as is best seen in FIG. 1.

A fourth bore, 134, parallel to the bores 110, 112 and 114, is located in the upper portion of the cylindrical shaft 108 and receives therein a valve handle 136.

Located between the handle 136 and the shoulder 132 is a radially extending stop pin 138. Extending outwardly from the valve housing 12 are a pair of stop bars 140 and 141, which are located one on either side of the stop pin 138 so as to limit the angular rotation of the triple plug valve 18 to a 90° rotation.

This is best seen in FIG. 6.

Figure 8:
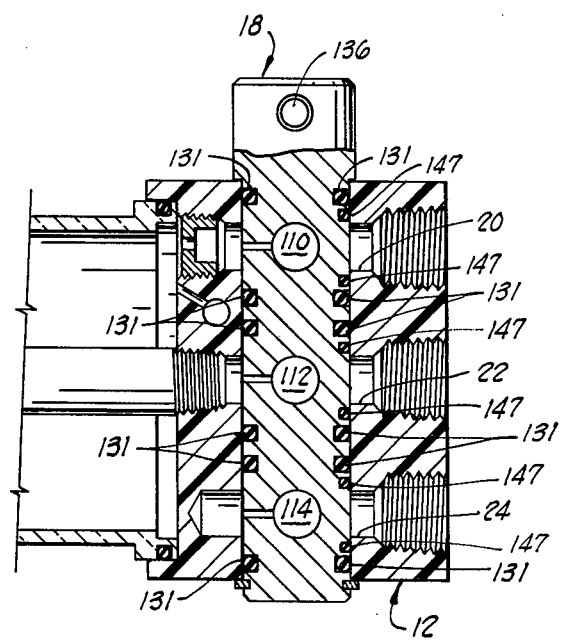
FIG. 8 is a sectional view of the valve housing of the spray gun of FIG. 1, with the triple plug valve in the closed position.

Located on the peripheral surface of the shaft 108, about axes substantially perpendicular to the bores 110, 112 and 114, and to the central axis of the shaft 108, are substantially circular sealing grooves 142, 144 and 146, respectively. Each of the sealing grooves is constructed so as to receive therein a resilient O-ring 147, as is best seen in FIG. 8 where the triple plug valve 18 is shown in the closed position.

On the opposite side of each of the bores 110, 112 and 114, from the sealing grooves 142, 144 and 146, are bleed orifices 148, 150 and 152, respectively. The bleed orifices 148, 150 and 152 are oriented to be in partial communication with the downstream portion of the bores 20, 22 and 24, respectively, when the triple plug valve 18 is in the closed position as illustrated in FIG. 6.

To assemble the plug valve 18 within the valve housing 12, resilient seal means 131 are placed in each of the annular grooves 120, 122, 124, 126, 128 and 130. Additionally, resilient O-rings 147 are placed in each of the sealing grooves 142, 144 and 146. The triple plug valve 18 is then inserted within the bore 16 of the valve housing 12 and is closely received therein. When the triple plug valve 18 is fully inserted, the shoulder 132 abuts the outer surface of the valve housing 12 and the keeper key 118 is placed within the annular key retaining groove 116 to retain the triple plug valve in place within the valve housing 12.

The triple plug valve is located so that the stop pin 138 is located between the stop bars 140 and 141, as seen in FIG. 6. When the triple plug valve 113 is in the open position as seen in FIG. 1 with the bores 110, 112 and 114 aligned with the bores 20, 22 and 24, respectively, the stop pin 138 is in engagement with the stop bar 140. To move the valve 118 to the closed position, the valve is rotated through an angle of 90° clockwise, as seen in FIG. 6, to the position shown in FIG. 6 where the stop pin 138 engages the stop bar 141. In this position, the sealing grooves 142, 144 and 146 circumferentially engage the bores 20, 22 and 24 adjacent the inlets 28, 36 and 42, respectively. The resilient O-rings 147 disposed in the sealing grooves 142, 144 and 146 serve to prevent leakage of the fluids into the valve housing when the valve is in the closed position.

Another alternative embodiment of the insulation spray gun of the present invention is shown in FIGS. 9-12, and is generally designated by the numeral 200. Spray gun 200 differs from spray gun 10 of FIG. 7 in that spray gun 200 includes a deflector shield 202 over foaming agent outlet 30 and includes an adjustable resin nozzle 204.

Figure 10:
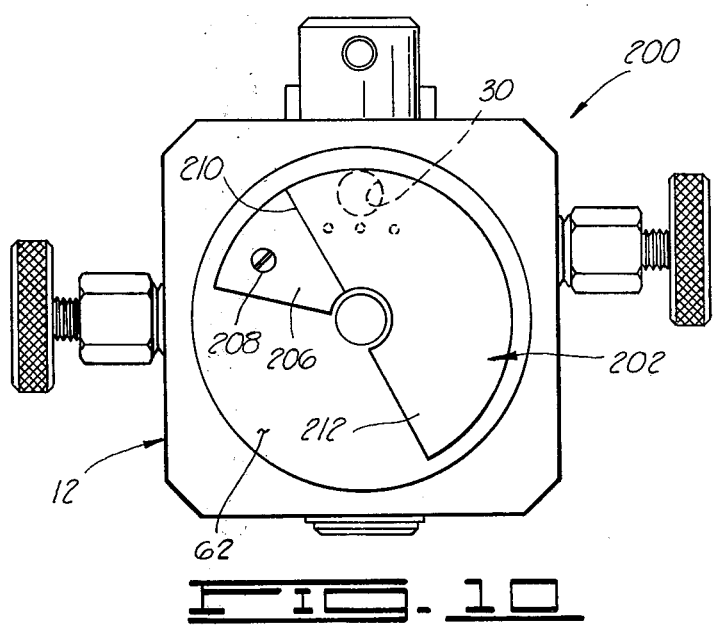
FIG. 10 is a frontal view of the valve housing of FIG. 9 showing the deflector shield.

Deflector shield 202 is best shown in FIG. 10 and is an arcuate plate having a first end 206 attached to front surface 62 of valve housing 12 by a screw 208. First end 206 is substantially flat and coextensive with flat surface 62.

Figure 9:
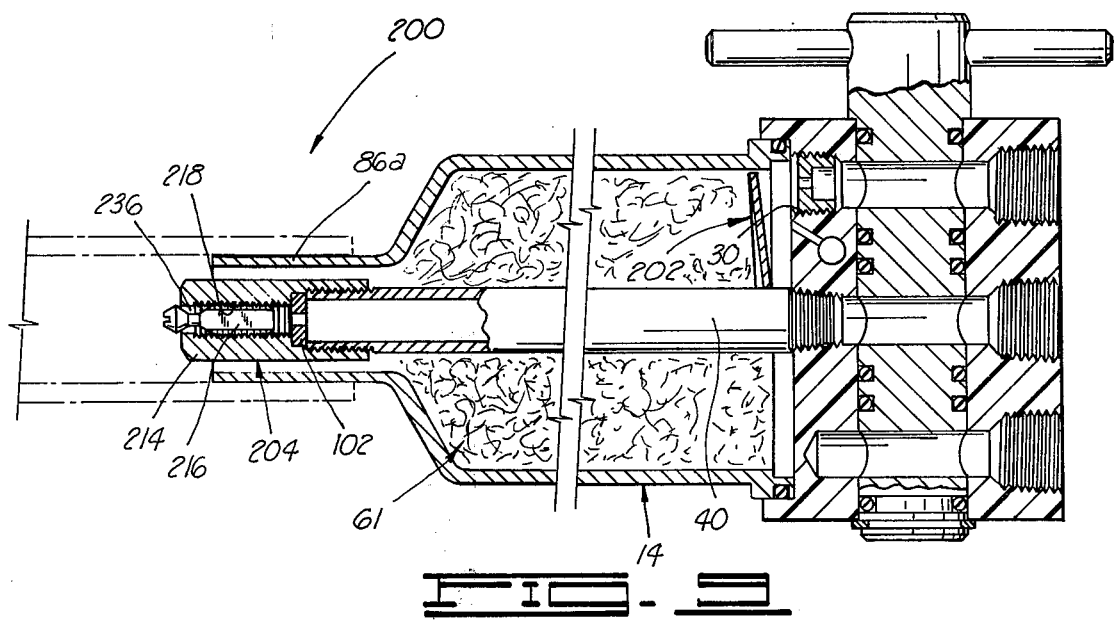
FIG. 9 is a sectionally partially cut-away view of another alternative embodiment of the present invention having an annular spray nozzle and having a deflector shield over the foaming agent outlet.

There is a bend 210 in deflector shield 202 near first end 206, and an approximately 180° arcuate portiion of deflector shield 202 between bend 210 and a second end 212 is formed in a spiral-like manner as illustrated in FIG. 9.

Deflector shield 202 imparts an initial swirling motion to the foam mixture to insure that the mixing chamber 14 is completely filled. This prevents the foam mixture from creating a short circuit path between foaming agent outlet 30 and the elongated forward extension 86a of cylindrical body 74 through the porous filler material 61. The filler material 61, however, breaks up the swirling motion so that a substantially homogeneous axially flowing annular stream of foam mixture exits forward extension 86a.

The adjustable resin nozzle 204 includes a nozzle body 214 and a spray nozzle insert 216. Nozzle body 214 is threadedly connected to resin tube 40 so as to hold resin metering insert 102 in place. Nozzle body 214 has a threaded central bore 218 in which spray nozzle insert 216 is threadedly received.

Figure 11:
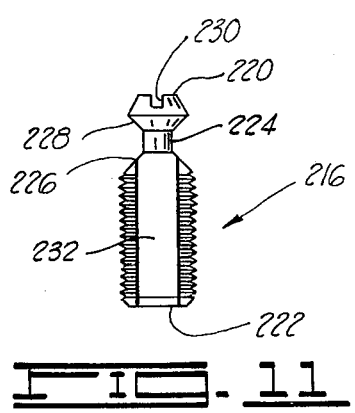
FIG. 11 is an elevation view of the spray nozzle insert of the embodiment of FIG. 9.
Figure 12:
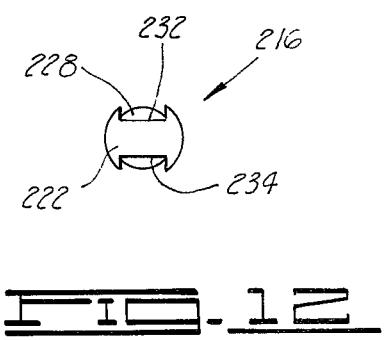
FIG. 12 is bottom view of the spray nozzle insert of FIG. 11.

Elevation and bottom views of spray nozzle insert 216 are shown in FIGS. 11 and 12, respectively. Insert 216 is machined from a cylindrical brass bar and includes a forward end 220 and a rear end 222.

A reduced outer diameter portion 224 has tapered annular shoulders 226 and 228 at the ends thereof. Shoulders 226 and 228 are inclined at 30° angles to the longitudinal axis of insert 216.

Upper end 220 includes a slot 230 for receiving a screwdriver to adjust the position of insert 216 within nozzle body 214.

Two milled flats 232 and 234 connect annular shoulder 226 with rear end 222. When insert 216 is in place within nozzle body 214 as shown in FIG. 9, the resin from resin tube 40 flows past flats 232 and 234 into an annular space 236 between nozzle body 214 and reduced diameter portion 224 and then exits in an annular spray between tapered shoulder 228 and the forward end 238 of nozzle body 214. The annular spray exits at an angle of approximately 30°.

OPERATION

The spray foam insulation gun 10 is used in the following manner to produce foam insulation and deposit the foam in place within a structure to be insulated, such as within the walls of a building. This operation is best explained with reference to FIG. 2.

Figure 2:
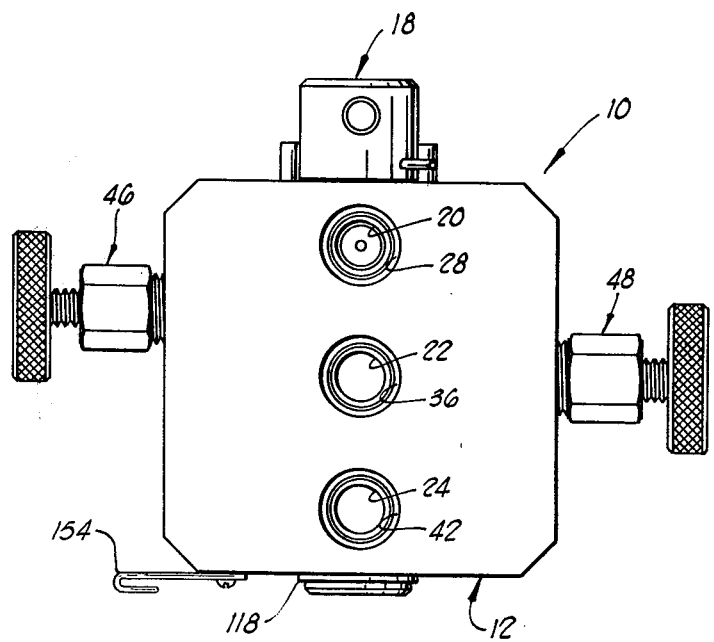
FIG. 2 is a rear view of the apparatus of FIG. 1.

The insulation gun 10 is preferably rotated 90° clockwise from the position shown in FIG. 2 and is attached to the belt of a workman by means of the belt clip 154 attached to the valve housing 12. Conventional supply lines for the foaming agent, resin and air are hooked to the threaded inlets 28, 36 and 42, respectively. A hose 97 is attached to the front end of the insulation gun 10, as shown in FIG. 1, and the workman uses the hose 97 to direct the foam-resin mixture to the desired location.

Prior to starting the foaming operation the triple plug valve 18 is moved to the closed position and the supply lines to the inlets 28, 36 and 42 are opened thereby providing pressurized foaming agent, resin and air to those inlets. The purge valve 48 is closed and the air control valve 46 is opened to an intermediate position.

To start the foaming operation the triple plug valve 18 is turned to the open position thereby allowing the foaming agent and air to flow to the mixing chamber 14 and allowing resin to flow to the nozzle 94 where it is mixed with the foam. The foam resin mixture is then transferred to the desired location by means of the hose 97.

To achieve the desired foaming within the mixing chamber 14 the air flow thereto is adjusted by means of the air control valve 46.

When the foaming operation is ended the triple plug valve 18 is closed and the purge valve 48 is immediately opened to direct compressed air through the resin tube and out the resin orifices 96 of the nozzle 94 to clear them of any foam-resin mixture before it has time to harden and clog the resin metering orifice 104 and the resin orifices 96.

It will be appreciated that in this manner the foam insulation spray gun 10 may be used repeatedly without having to be disassembled for cleaning of the orifices. Also the purge air serves to clear the foam-resin mixture from the hose 97 before it has time to harden inside the hose.

Thus, the foam insulation spray gun of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A spray foam insulation gun, comprising:
   a valve housing, having first, second and third substantially parallel inlet bores disposed therein for connection to supplies of foaming agent, resin and compressed air, respectively, and having a valve bore, disposed therethrough, transverse to and intersecting said inlet bores;

a mixing chamber, connected to said valve housing, for mixing said foaming agent and compressed air to form a foaming agent-compressed air mixture;

a resin nozzle, located downstream of said mixing chamber, for ejecting resin into said foaming agent-compressed air mixture;

first valve means disposed in said valve bore of said valve housing for selectively connecting and disconnecting said first and third inlet bores to said mixing chamber, and said second inlet bore to said resin nozzle;

port means, communicating said third inlet bore, downstream of said first valve means, with said mixing chamber;

a foaming agent outlet communicating said first inlet bore with said mixing chamber; and means for communicating said second inlet bore with said resin nozzle.

2. The spray foam insulation gun of claim 1, further comprising:
second valve means, engaging said port means, for controlling the flow of air to said mixing chamber.

3. The spray foam insulation gun of claim 2, wherein:
said port means further comprises an air ejection orifice communicating with said mixing chamber adjacent said foaming agent outlet.

4. The spray foam insulation gun of claim 3, further comprising:
a deflector shield located downstream of said foaming agent outlet and said air ejection orifice to deflect said foaming agent-compressed air mixture.

5. The spray foam insulation gun of claim 4, wherein:
said deflector shield is further characterized as being an arcuate spiral shaped shield means for initially directing said foaming agent-compressed air mixture is a spiral flow through said mixing chamber.

6. The spray foam insulation gun of claim 3, further comprising:
a foaming agent orifice disposed in said foaming agent outlet; and
wherein said air ejection orifice is oriented so that a stream of air emitted from said air ejection orifice will impinge upon a stream of foaming agent emitted from said foaming agent orifice.

7. The spray foam insulation gun of claim 6, further comprising:
a second air ejection orifice, oriented non-parallel to said first air ejection orifice.

8. The spray foam insulation gun of claim 3 wherein said port means further comprises:
a first port, communicating said third inlet bore with said second valve means; and
a second port, communicating said second valve means with said air ejection orifice; said first and second ports being disposed within said valve housing in a plane substantially perpendicular to said inlet bores.

9. The spray foam insulation gun of claim 8 further comprising:
a drilling cavity, communicating said third inlet bore with an external surface of said valve housing, said drilling cavity being disposed within substantially the same plane as said first and second ports, so that said first port can be drilled into said valve housing; and
plug means, disposed in said drilling cavity for closing said cavity after said first port has been drilled.

10. The spray foam insulation gun of claim 8, further comprising:
purge valve means;
a third port disposed within said valve housing, communicating said third inlet bore, upstream of said first valve means, with said purge valve means; and
a fourth port disposed within said valve housing, communicating said purge valve means with said second inlet bore, downstream of said first valve means, whereby the flow of air to said second inlet bore may be controlled by said purge valve means.

11. The spray foam insulation gun of claim 1, further comprising:
port means, communicating said third inlet bore, upstream of said first valve means, with said second inlet bore, downstream of said first valve means; and
purge valve means, engaging said port means for controlling the flow of air to said second inlet bore.

12. The spray foam insulation gun of claim 11, wherein said port means further comprises:
a first port disposed within said valve housing, communicating said third inlet bore with said purge valve means; and
a second port disposed within said valve housing, communicating said purge valve means with said second inlet bore.

13. The spray foam insulation gun of claim 1, wherein:
said means for communicating said second inlet bore with said resin nozzle is a tube located within said mixing chamber.

14. The spray foam insulation gun of claim 13, further comprising:
a resin metering orifice, communicating said resin tube with said resin nozzle.

15. The spray foam insulation gun of claim 13 wherein said nozzle further comprises:
a radially angularly extending resin ejection means for ejecting resin into said foaming agent-compressed air mixture.

16. The spray foam insulation gun of claim 1, wherein:
said resin nozzle includes a bore and a threaded counterbore, and a resin ejected means for communicating said bore with an external surface of said nozzle.

17. The spray foam insulation gun of claim 16 wherein:
said means for communicating said second inlet bore with said resin nozzle includes a resin tube, one end of which communicates with said second inlet bore, and the other end of which engages said threaded counterbore of said resin nozzle; and
said gun further includes a resin metering orifice insert, disposed within said counterbore of said nozzle between said resin tube and a shoulder formed by said bore and counterbore.

18. The spray foam insulation gun of claim 16, further comprising:
a cylindrical extension communicating with a downstream end of said mixing chamber, said cylindrical extension being concentric with and radially spaced from said nozzle so that said foaming agent-compressed air mixture will exit the mixing chamber through an annular space between said cylindrical extension and said nozzle, in a direction substantially parallel to a longitudinal axis of said nozzle.

19. The spray foam insulation gun of claim 1, wherein:
said mixing chamber includes a cylindrical outer body, one end of which engages said valve housing.

20. The spray foam insulation gun of claim 19, further comprising:
a concentric cylindrical extension of reduced diameter communicating with the other end of said mixing chamber, said cylindrical extension being concentric with and radially surrounding said nozzle.

21. The spray foam insulation gun of claim 20, wherein:
said means for communicating said second inlet bore with said resin nozzle includes a resin tube concentric with said cylindrical outer body, said resin tube communicating said second inlet bore with an internal bore of said resin nozzle.

22. The spray foam insulation gun of claim 1, wherein said first valve means is further characterized as comprising:
a triple plug valve for simultaneously selectively connecting and disconnecting said first and third inlet bores to said mixing chamber, and said second inlet bore to said resin nozzle.

23. The spray foam insulation gun of claim 22, wherein said triple plug valve comprises:
a cylindrical shaft, closely received in said transverse plug valve bore; and
three substantially parallel bores through said cylindrical shaft, substantially perpendicular to a central axis of said shaft, said bores being oriented to coincide with said inlet bores of said valve body when said triple plug valve is in a first open position.

24. The spray foam insulation gun of claim 23 wherein said triple plug valve further comprises:
annular seal grooves spaced along the length of said cylindrical shaft, one of said grooves being disposed on either side of each of said bores through said shaft; and
resilient seal means disposed in each of said annular grooves.

25. The spray foam insulation gun of claim 23, wherein said triple plug valve further comprises:
three annular seal grooves, disposed in the peripheral surface of said shaft and each concentric with an axis substantially perpendicular to a central axis of each of said three bores through said shaft, so that when said triple plug valve is rotated through an angle of 90° from said first open position, it is in a second closed position so that each of said annular seal grooves circumferentially engages one of said three inlet bores of said valve housing to disconnect said bores from the mixing chamber and nozzle.

* * * * *

UNITED STATES PATENT AND TRADEMARK OFFICE
CERTIFICATE OF CORRECTION

PATENT NO. : 4,263,166
DATED : April 21, 1981
INVENTOR(S) : Ladd M. Adams

It is certified that error appears in the above-identified patent and that said Letters Patent are hereby corrected as shown below:

In the Claims:

Column 10, line 43 - delete "radially" and insert --radial--.

Column 10, line 49 - delete "ejected" and insert --ejection--.

Signed and Sealed this

Twenty-fifth Day of August 1981

[SEAL]

Attest:

Attesting Officer

GERALD J. MOSSINGHOFF

Commissioner of Patents and Trademarks